Figure 1:
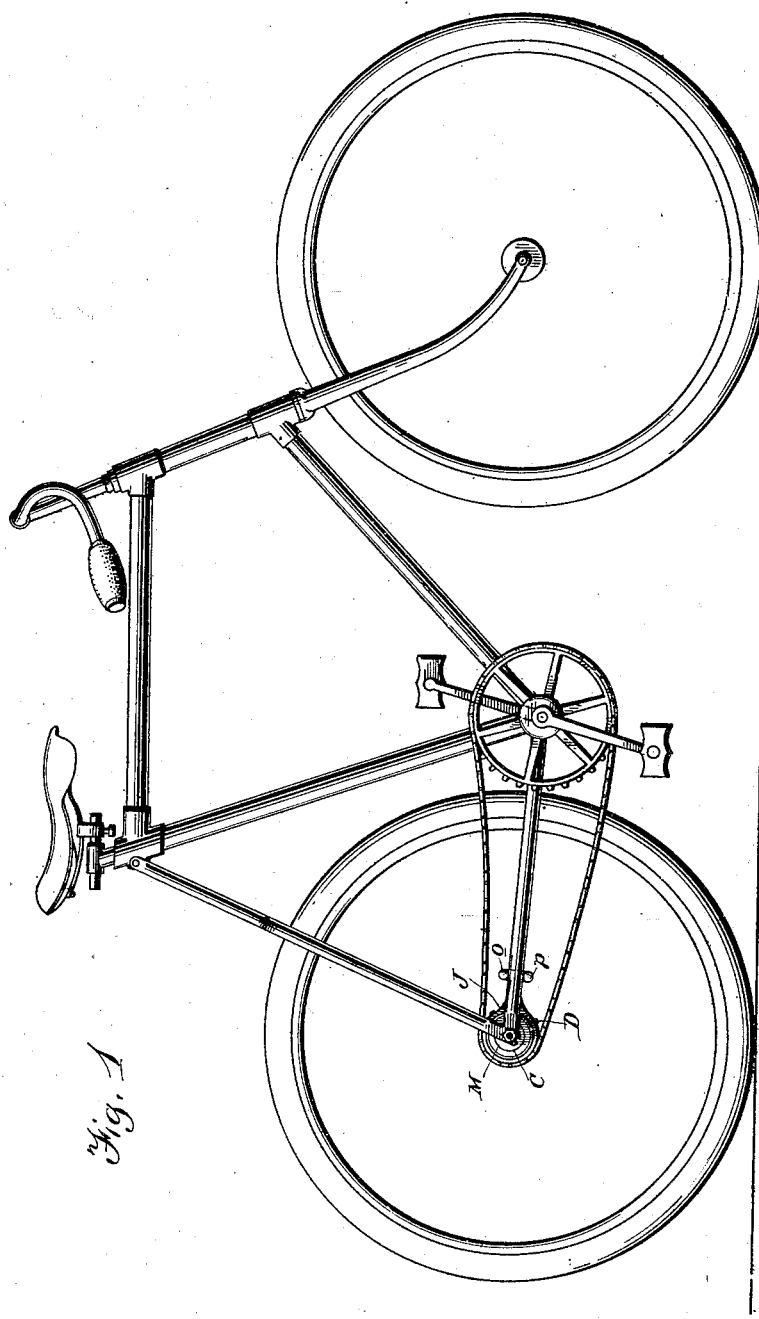

No. 696,975. Patented Apr. 8, 1902.
O. C. HOWES.
PROPELLING AND BRAKE MECHANISM FOR VEHICLES.
(Application filed Oct. 24, 1900.)
(No Model.) 5 Sheets—Sheet 1.

WITNESSES
J. B. Malnati
G. C. Lyddane

INVENTOR:
Omar C. Howes
by Dodge and Sons,
Attorneys

THE NORRIS PETERS CO., PHOTO-LITHO., WASHINGTON, D. C.

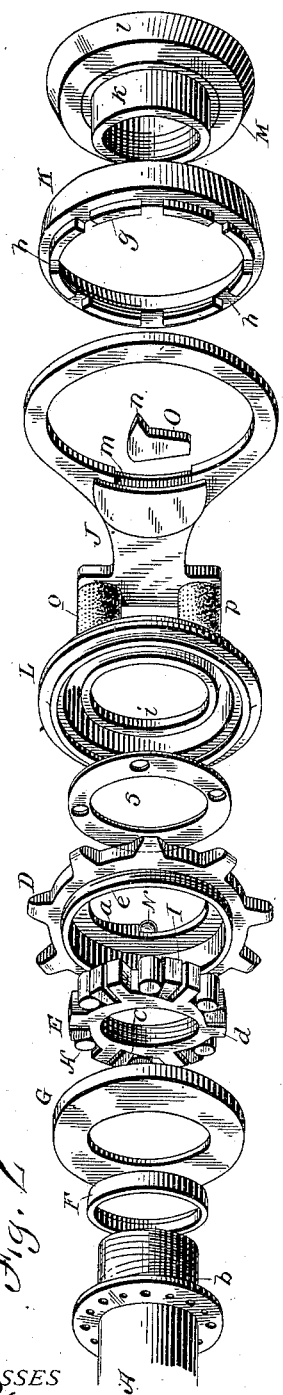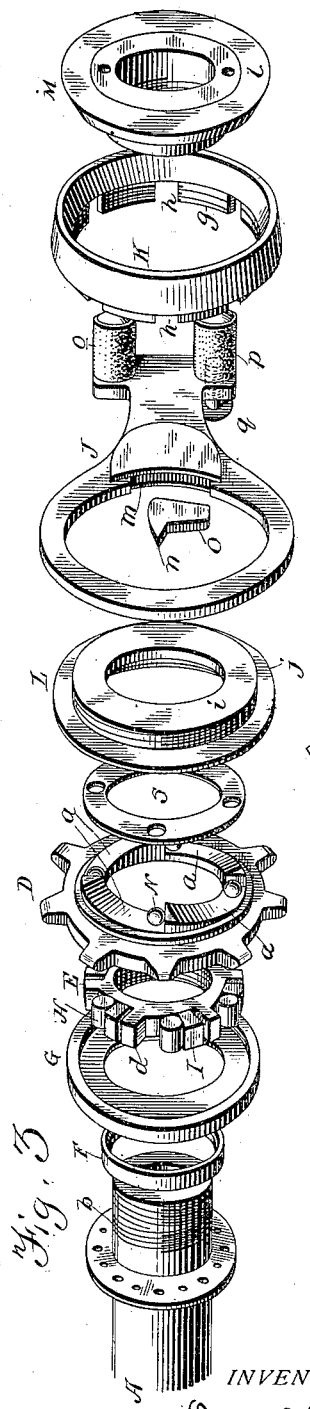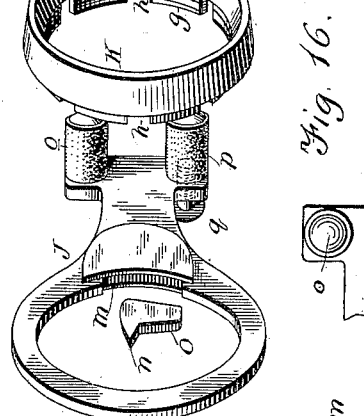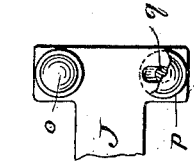

No. 696,975. Patented Apr. 8, 1902.
O. C. HOWES.
PROPELLING AND BRAKE MECHANISM FOR VEHICLES.
(Application filed Oct. 24, 1900.)
(No Model.) 5 Sheets—Sheet 3.
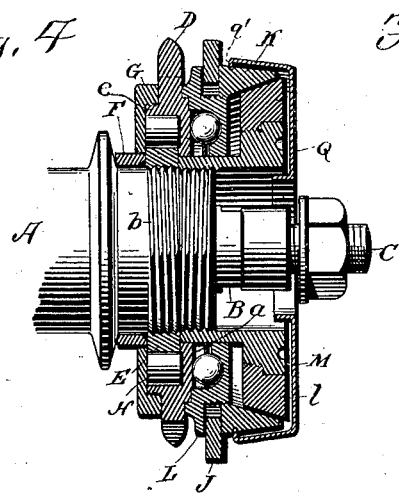
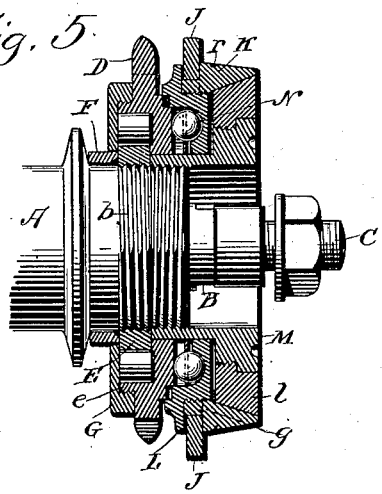
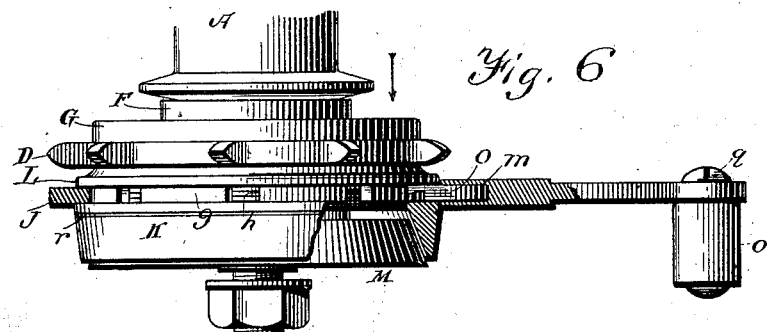
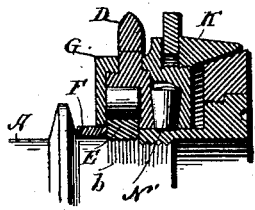
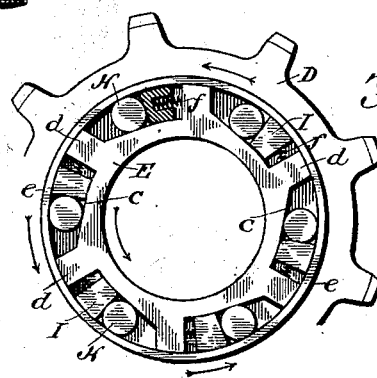
WITNESSES
INVENTOR:

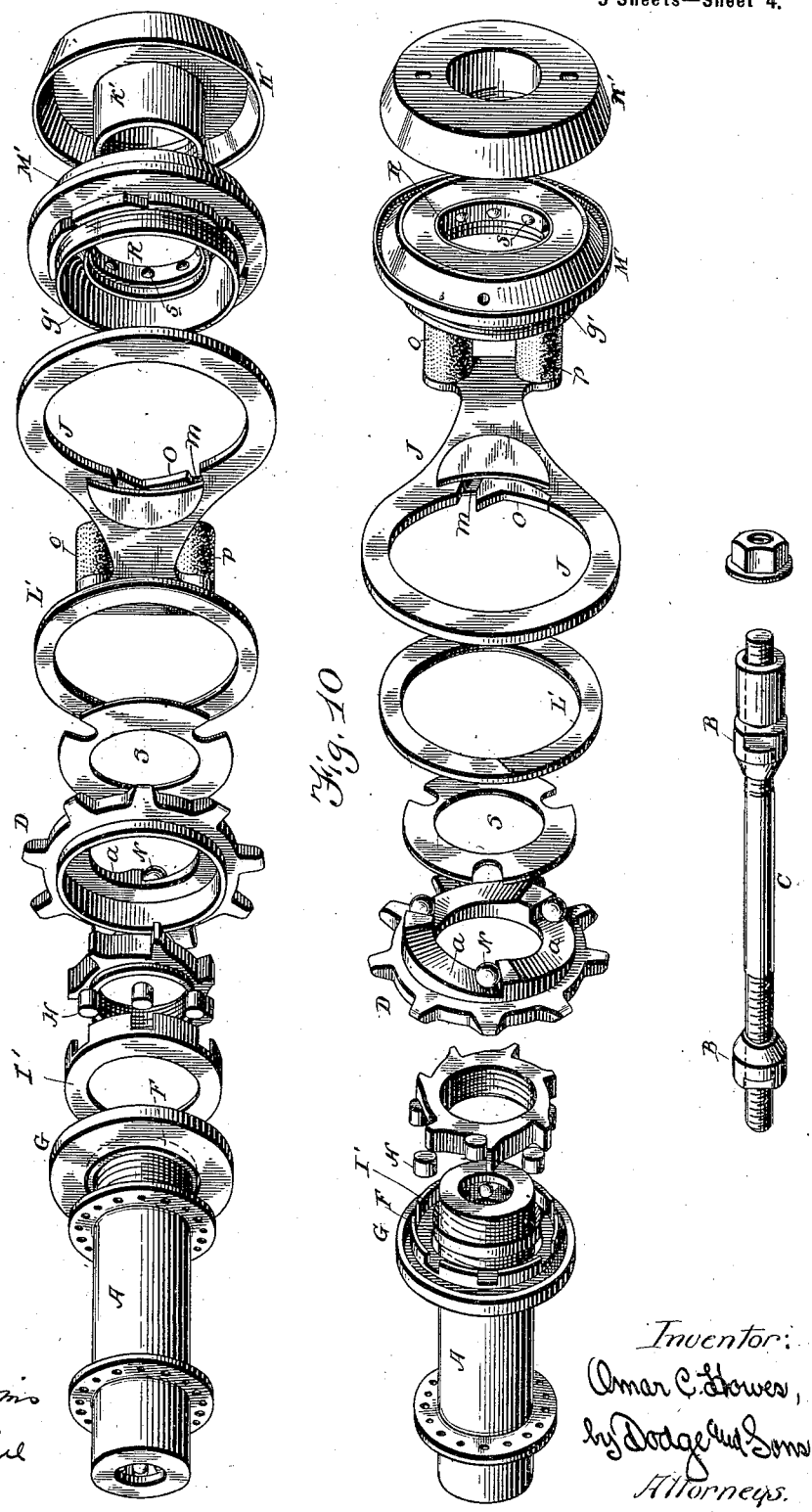

No. 696,975. Patented Apr. 8, 1902.
O. C. HOWES.
PROPELLING AND BRAKE MECHANISM FOR VEHICLES.
(Application filed Oct. 24, 1900.)
(No Model.) 5 Sheets—Sheet 5.

Witnesses,
J. E. Jenkins
D. E. Burdine

Inventor:
Omar C. Howes,
by Dodge and Sons,
Attorneys.

UNITED STATES PATENT OFFICE.

OMAR C. HOWES, OF CORTLAND, NEW YORK, ASSIGNOR TO THE CORTLAND CARRIAGE GOODS COMPANY, OF CORTLAND, NEW YORK, A CORPORATION OF NEW YORK.

PROPELLING AND BRAKE MECHANISM FOR VEHICLES.

SPECIFICATION forming part of Letters Patent No. 696,975, dated April 8, 1902.

Application filed October 24, 1900. Serial No. 34,208. (No model.)

*To all whom it may concern:*

Be it known that I, OMAR C. HOWES, a citizen of the United States, residing at Cortland, in the county of Cortland and State of New York, have invented certain new and useful Improvements in Propelling and Brake Mechanism for Vehicles, of which the following is a specification.

This invention pertains to mechanism for imparting motion to and for braking or retarding the motion of driven wheels or bodies.

The device is designed more particularly for application to bicycles and like vehicles, and its purpose is to enable the rider to propel the machine in the ordinary way by pressure upon the pedals in the forward direction to permit the vehicle to run free and independently of the propelling mechanism when the pedals are held at rest and to enable the operator by backward pressure upon the pedals to brake the wheel or apply retarding-friction to such extent or degree as may be desired.

Various novel features, combinations, and details are involved in the present invention and will be set out in the description which follows.

Among the objects sought to be attained by the present construction are simplicity and strength of parts, compactness, comparative freedom from wear, and certainty of action, together with the capability of rolling or moving the vehicle in a backward direction, and thereby moving backwardly the pedals and intervening connecting mechanism or devices. This latter capability is important in that it enables the rider to position the pedals by rolling the vehicle backward, that it enables him readily and conveniently to prop or support the vehicle by its pedal upon a curb or other support, and that in greater or less degree it relieves the mechanism of strain and protects it against injury in the event of the pedal encountering an obstacle while the vehicle is in motion.

Other advantages are found to flow from the construction hereinafter set forth, which, however, it is not deemed necessary to enumerate.

In the accompanying drawings I have represented the mechanism in two equivalent but slightly-varying forms or embodiments. The preferred form will be first described. This is represented in Figures 2 to 8, inclusive, while the modification is illustrated in Figs. 9 to 14, inclusive.

Figure 11:
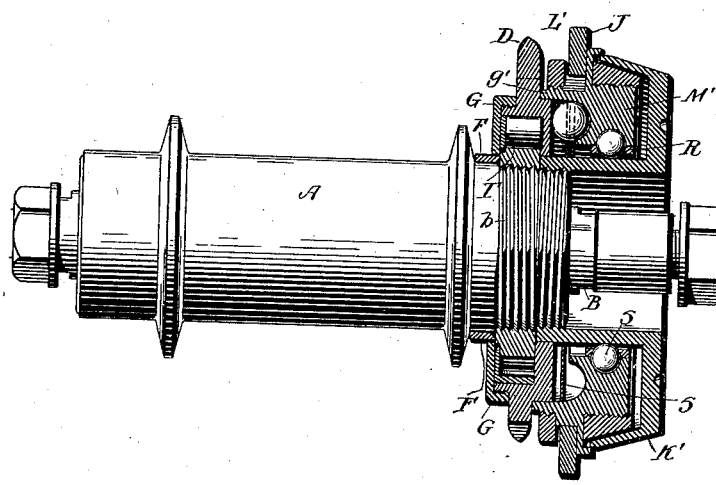
Figure 12:
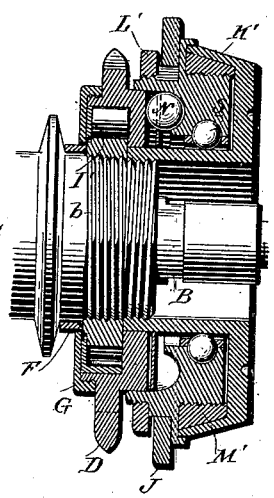
Figure 13:
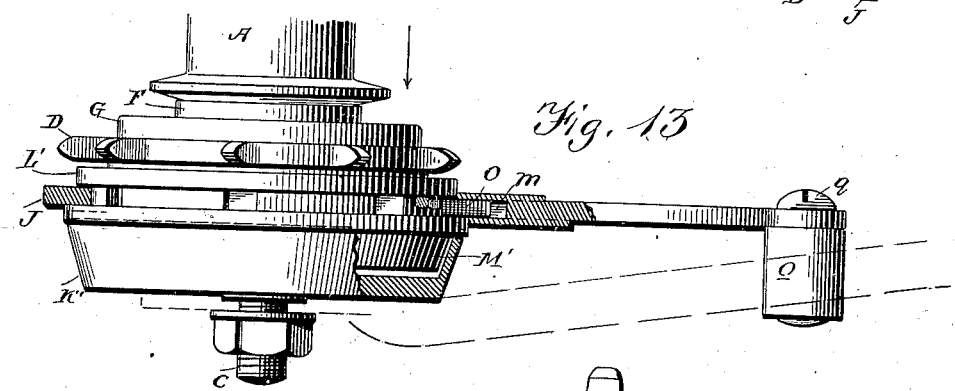
Figure 14:
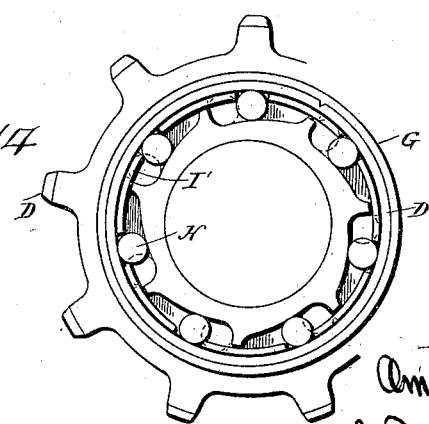

More specifically referring to the drawings, Fig. 1 is a side elevation of a bicycle provided with the improved device; Figs. 2 and 3, perspective views of the several parts composing the clutching and braking mechanism, said parts being separated to show their form and construction and the order or arrangement of the parts in assembling them, the two views being taken from opposite sides. Fig. 4 is a transverse section showing the parts in their driving relation, which may also stand for their coasting relation; Fig. 5, a similar view, but with the parts forced into braking contact or relation; Fig. 6, a top plan view of the attachment with the outer braking cone or ring broken away; Fig. 7, a side elevation of the driving-clutch; Fig. 8, a sectional view of a portion of Fig. 4, showing conical rollers in lieu of balls or spherical rollers interposed between movable parts of the braking mechanism. Figs. 9 and 10 are perspective views of the same character as Figs. 2 and 3, but showing a modified construction of the mechanism; Fig. 11, a sectional elevation of the same, showing the parts in driving or in coasting relation; Fig. 12, a similar section showing them in braking relation; Fig. 13, a top plan view of the attachment, partly in section; Fig. 14, a side elevation of the driving-clutch; Fig. 15, a detail view of a locking pawl or dog, and Fig. 16 a detail view of the yoke by which one of the brake members is held.

Referring first to the mechanism represented in Figs. 2 to 8, inclusive, A indicates the hub of a driven wheel, which, as is customary in bicycles and similar vehicles, is made of hollow or tubular form and is arranged to rotate normally upon balls or other antifriction-rollers interposed between races or seats in said hub and cones B, carried by an axle C. These parts may all be of usual or common construction, and the axle will or may be held in the rear fork of the bicycle or in other usual part of the vehicle, to which it is applied in the ordinary way.

D indicates a wheel, here represented as a sprocket-wheel such as is commonly used in chain-driven bicycles and like vehicles as a means through which to transmit motion from the pedal-shaft or other source of power to the driven wheel or other part; but obviously this may receive motion from the pedal-shaft in any common or well-known way or through any usual means of transmission. It is therefore to be understood that the sprocket-wheel D stands for or represents any transmitting member through which motion may be given to the parts upon which it acts in the mechanism now being described.

The sprocket-wheel D is, as best shown in Fig. 3, formed with a series of inclines or cam-faces $a$ on one side and is recessed or bored out to receive or to encircle a clutch-hub E of the form shown in Figs. 2, 3, and 7. This hub E when the mechanism is applied to the rear or driving wheel of a bicycle of the ordinary type with a right-hand drive is threaded to screw upon a right-hand thread $b$, formed upon the hub A. It may be screwed against a shoulder formed on said hub, or, as is preferred in practice, a spacing-collar F may be interposed between the spoke-flange of the hub and the sprocket-wheel, as shown in Figs. 4, 5, and 6. This collar serves to determine accurately the position of the sprocket and avoids the necessity of thickening the hub at this point.

Previous to screwing the clutch-hub E upon the hub A an annular cap or plate G is passed over the end of the hub and about the collar F, or the portion of the hub corresponding to said collar if the collar be not used. This cap G is formed with an annular flange, which is internally threaded to receive a correspondingly-threaded neck formed upon the sprocket-wheel D, the two parts screwing together and forming in effect one internally-recessed sprocket-wheel.

The clutch-hub E is formed with a series of inclines or cam-faces $c$, tangential or practically tangential to a circle concentric with the clutch-hub, but of less radius than said hub, and with radial abutments $d$, extending outward beyond the inclined faces, as well shown in Fig. 7. The hub E is of such diameter as to fit accurately within the neck $e$ of sprocket-wheel D—that is to say, the ends of the projections or abutments $d$ are turned or dressed to be concentric with the hub and are of a radius just enough less than that of neck $e$ to permit the hub E to enter within said neck and into the recessed body of wheel D.

Within the spaces between the inclines $c$ and the annular wall of neck $e$ are placed cylindrical rollers H, each of a diameter equal to the radial measurement of the spaces between the inclines and the inner wall of the recess in hub D at or near the mid-length of the inclines. Under this arrangement, as will be seen, the rollers when in the wider ends of the open spaces will be free and will leave sprocket-wheel D and clutch-hub E free of and disconnected from each other; but when the rollers pass into the narrow ends or portions of said spaces and bear upon the inclines at one side and the inner wall of the recess in wheel D at the other side they will cause said parts to lock together with a force proportionate to the wedging of the rollers between said surfaces. Any tendency of the parts so to move as to force the rollers into the narrow or contracted portions of the spaces will of course simply increase the binding or locking action of the rollers and more firmly lock together the clutch-hub and the sprocket-wheel.

The clutch-hub E being firmly screwed or otherwise secured upon the hub A of the driven wheel, it will readily be seen that if rotary motion be applied to the sprocket-wheel D in a forward direction the rollers H will by reason of the frictional contact of the inner wall of said wheel thereon be carried forward on the inclines or cam-faces $c$ toward the narrower ends of the recesses or spaces in which the rollers are placed, and consequently will lock the sprocket-wheel and the clutch-hub together and turn forward the hub A of the driven wheel. To insure prompt and certain engagement of the several rollers H upon imparting forward rotation to sprocket-wheel D, it is preferred to place in the wider ends of the roller cavities or spaces follower blocks or shoes I and to interpose between said blocks and the abutments $d$ light springs $f$, which shall serve to press said blocks into contact with the rollers and to urge said rollers toward the narrower ends of their containing-spaces. Any suitable form of spring may be employed, though I prefer to make use of a light spiral spring of wire, one end of which is advisedly seated in a socket or recess drilled or otherwise formed in the face of the block or shoe facing the abutment $d$. This construction is illustrated in Fig. 7.

If after the vehicle is put in motion the sprocket-wheel D be held at rest, the clutch-hub E, being fast to and rotating with the hub A of the driven wheel, will move forward relatively to the sprocket-wheel, and the rollers H being in contact with the then stationary wheel D will roll on its inner surface and on the inclines or cam-faces $c$ toward the wider ends of the roller-spaces, slightly forcing back the shoes or followers I against the resistance of the springs $f$ and at once freeing the driven wheel from the sprocket. The clutching and unclutching actions thus described are those which occur when driving the wheel through motion imparted to the sprocket-wheel or when coasting or running through momentum of the vehicle with the sprocket-wheel and its actuating mechanism held at rest.

The shoes or followers I are not essential and may be omitted, as may also the springs $f$. It is, however, preferred to employ both.

Mention has been made of the cam-faces or inclines $a$, formed upon the side face of the sprocket-wheel D. These inclines or cams are for the purpose of producing frictional contact between brake members, which will now be described, such friction being produced by slightly turning the sprocket-wheel D in a backward direction.

J indicates a yoke, here represented in the form of an annular plate with a forwardly-projecting arm terminating in a T end. Swiveled in the annular portion of the yoke or plate J is a hollow cone or cone-ring K, formed with a reduced neck $g$, cut away at intervals to form notches or openings $h$. The cone-ring K is held in its seat in the yoke J by means of a disk L, comprising a smaller portion $i$, which is circumferentially threaded to screw into the correspondingly-threaded neck $g$ of cone-ring K, and a radial flange or larger portion $j$, which bears against the inner face of the yoke or plate J and prevents the cone-ring K from becoming disconnected from said yoke. The smaller portion $i$ of the disk or member L constitutes a bearing-surface for rollers, which are interposed between said disk and the cam-faces or inclines $a$ of the sprocket-wheel D, said rollers serving to give a comparatively frictionless bearing or support for the cams or inclines when the latter act through backward rotation of the sprocket-wheel D to force the cone-ring K laterally into contact with a coacting cone member M, screwed upon the hub A.

In Figs. 2 to 5, inclusive, the interposed rollers N are represented as of spherical form and they may be so made in practice. It is preferred, however, to employ in lieu of the balls or spheres conical rollers N′, such as shown in Fig. 8, to which further reference will later be made.

As above mentioned, M indicates a cone designed to coact with the cone-ring K. It is formed with a neck $k$, which passes through central openings in disk L and sprocket-wheel D and screws upon the end of hub A of the driven wheel or member. Where the direction of rotation is as above described and a right-hand drive is employed, as here contemplated, the thread by which the cone M is secured upon the hub A is a left-hand thread, so that as the hub A of the driven wheel continues its forward motion it shall tend to screw into rather than out of the threaded neck of cone M when the latter is subject to retarding friction. It will be observed, too, that the cone M or its threaded neck serves as a jam-nut or locking-nut to more effectually retain in place the clutch-hub E.

In the drawings the cone M is represented as formed in two parts, the outer or larger portion $l$ being screwed or otherwise made fast upon the central portion, so that it may be readily removed and replaced in case of wear or injury and so, too, that it may be made of a material different from that of such central portion.

From the foregoing description it will readily be understood that if the cone-ring K be held against rotation and be forced into close and firm frictional contact with cone M of the driven wheel said wheel will be retarded in its rotation or brought to a stop, the degree of retardation depending upon the pressure applied and the friction produced.

The cone-ring K is locked and held against forward rotation, or rotation in the direction in which the driven wheel turns, by means of a locking dog or pawl O, seated in a cavity $m$, formed in the yoke or plate J at the forward side of the opening made therein to receive the neck $g$ of cone-ring K. The form of the pawl or dog O is illustrated in Figs. 2 and 3, and both said dog and the cavity in which it is seated are formed with a view to giving great strength and adequate support to the pawl or dog and enabling it to withstand the very considerable strain to which it is subjected when the brake is applied.

The form of the pawl or dog and its seat is better illustrated in Fig. 15, where it will be seen to consist of a flat block of steel or like material, the inner face of which is curved to conform to the circumference of the neck $g$ of cone-ring K through the greater portion of its length, but provided at its upper end with a nose $n$, which projects beyond the curved front face or edge of the block O a distance equal to the thickness of neck $g$ and which is of a length equal to the length of the openings $h$ formed in said neck $g$. This nose has its greatest projection at the top of the block and joins the curved front edge of the block O by a regular incline, which, as shown in Fig. 16, reaches diagonally across the opening $h$ from end wall to end wall thereof. This bevel serves when the cone-ring K is turned backward both to lift and to force backward the block O, and thereby automatically to disengage it from the neck $g$ of the ring K. By thus releasing or unlocking said ring K it is made free to turn backward, notwithstanding the locking together of the cone members of the clutch. Consequently a vehicle provided with this device may be freely rolled backward, the entire brake mechanism, sprocket-wheel, chain, pedal-shaft, and pedals moving as in an ordinary chain-driven wheel devoid of such brake device.

The block O is of tapering form and in moving downward in its seat, which is of like form, not only tends naturally to move forward, but also to wedge or press forward against the outer face of neck $g$ of the cone-ring K, and thus to bind the same frictionally as well as to lock it by positive engagement. This action may or may not be provided, its occurrence or non-occurrence being dependent upon the depth of the seat measured radially from the axis of the cone-ring upon the measurement of the block P in the same direction and upon the range of movement of said block.

The yoke J is held against rotary movement by means of studs or stop-pins o p, the upper one of which is rigidly or permanently secured to or formed upon one of the branches or arms of the T-head in which said yoke terminates, while the lower stud is made in the form of an elongated nut and is adjustably secured to the lower T-arm of said yoke by means of a tap-screw q passing through a slot in said arm and screwing into said stud. The purpose of making this stud adjustable is to permit the device to be applied to vehicles of different style, pattern, or size, and to be used thereon without liability of rattling or play, the movable stud being adjusted so as to cause both studs to bear firmly upon the member of the frame of the vehicle to which they are applied or by which the yoke is held against turning. It is deemed expedient to cover these studs o and p with rubber, leather, or other comparatively soft material to prevent abrasion of the metal or its paint or enamel and to prevent noise in the event of even minute play.

The parts being assembled in the order described and as illustrated, the action is as follows: Upon rotating the pedal-shaft in the driving direction motion is transmitted through a driving-chain or other intermediary to sprocket-wheel D, which, through the wedging of rollers H between the interior of the wheel and the clutch-hub E, locks these parts together and causes the hub A of the driven wheel to which the clutch-hub is secured to turn with the sprocket-wheel. If now, the driven wheel being in motion, the pedals be held stationary, the rolls H will be carried into the wider or larger ends of their containing spaces and the wheel will run free, as in coasting. Should it become desirable to retard the motion of the driven wheel or bring the same to rest, it is only necessary to press backwardly the pedals more or less, and thereby to turn backward the sprocket-wheel D, which motion will cause the inclines or cam-faces a to ride upon the rollers N and through them to force the cone-ring K into more or less firm contact with cone M. By varying the backward movement of the sprocket the lateral movement of cone-ring K and the consequent degree of friction between it and the cone M may be varied as desired. When the braking of the wheel is thus effected, which of course is done only when the driven wheel is moving or tending to move forward, the cone-ring K is held against forward rotation by reason of the engagement of dog or pawl O therewith, as explained.

Should it be desired at any time to turn the driven wheel backward and to move the sprocket-wheel, pedal-shaft, and attendant parts in unison therewith, this may be done as freely as with the common chain-driven wheel, the dog or pawl O being automatically moved upward and backward, and thereby disengaged from the cone-ring K.

It will be observed that the clutching and unclutching and the braking operations are performed without in any manner throwing pressure upon the ball-bearings of the hub of the driven wheel, which merely sustain the load placed upon the axle, as in any ordinary wheel of the kind.

Mention has been made of the employment of conical rollers instead of balls or spheres between the sprocket-wheel and disk L, and this is desirable in order to secure a long bearing for the rollers instead of concentrating the entire weight or pressure upon a single point. Such conical rollers are illustrated in Fig. 8, where it will be seen that at their outer ends the angle formed by the meeting of the longitudinal face and the end is smaller than that formed by the meeting of the face upon which they roll and the annular wall of the space in which they travel. From this construction, which is not specifically claimed, it follows that while the rollers are effectually prevented by the angle of the roll seating itself in the angle of the containing space from pressing or moving radially outward there is no rubbing contact between the ends of the rollers and the boundary wall of the space in which they move.

To protect the brake-cones from dust and rain or moisture, a light sheet-metal cap Q is provided, having a slight inturned lip or flange q', which upon the application of moderate pressure can be forced over and caused to spring into a circumferential groove r, formed in the cone-ring K, as seen in Figs. 4 and 5.

Figs. 9 to 14, inclusive, illustrate a modification of the invention, the main difference in which as compared with that above described resides in a reversal of the cone and cone-ring of the brake. For this reason the foregoing description and reference-letters will apply equally well to these figures, except as hereinafter pointed out.

Instead of employing the separate follower blocks or shoes I and springs f the rollers H are here shown as seated in recesses in a cage or flanged ring I', and instead of forming the raceway or seat for rollers N in the disk L it is formed in the interior of a cone M', swiveled in the yoke J and held in place therein by a nut or ring L', screwing upon its neck g', which latter extends through the opening in said yoke. Lastly, the cone-ring or hollow cone is here made in the form of a cup K', the neck k' of which screws upon the hub A in the same manner as does neck k of cone M in the preceding figures. The cone M' is preferably provided with a ball-cage R and balls s to cause it to rotate freely upon the neck k or to permit said neck to rotate within it without material friction.

The operation of the device is precisely the same as above described in connection with the preferred form.

Notched or perforated spacing-rings S may be used with advantage to maintain the rollers N in proper relative positions when spherical rollers are employed.

It will readily be seen that the main features of this invention may be utilized without adhering closely to all the details of construction above set forth and shown in the drawings. Thus any common and suitable form of clutch capable of engaging or locking only when itself turned forward may be employed. Mere transposition of the inclines $a$ and the raceway will be within my invention. Different well-known forms of locking device may be substituted for pawl O, and in other respects the details may be modified as circumstances require or as the skill of the mechanic may suggest, and this without at all departing from the scope or spirit of the invention.

The parts K and L or K' and L' being firmly screwed together become, in effect, one member and may for convenience of general reference be considered as jointly constituting the laterally-movable brake member. Since the part K or K' may be held in other ways, however, the part L or L' is not to be deemed an essential or necessary part of such brake member except where specifically so stated.

It will be seen that under my construction the laterally-movable brake member K or K' is positively and firmly locked against forward rotation, while free to rotate in a backward direction. This firm and positive locking of the brake member is of great practical importance, because without it and if friction alone were relied upon to cause engagement of the brake members there would always be a liability of slipping of the parts, the mere possibility of which would be fatal to the commercial success of the brake and a constant menace and element of danger to the rider.

The laterally-movable brake member and the locking device for holding it against forward rotation render the device positive and perfectly reliable in action under all circumstances.

Having thus described my invention, what I claim is—

1. In combination with a bicycle or like vehicle, a driving and braking device comprising a clutch member secured to the hub of the driven wheel; a second clutch member loose upon said hub; means for causing said second member to engage the companion member when itself turned in a forward direction; a brake member rigidly secured to or carried by said hub; a coacting brake member laterally movable toward and from the first; a non-rotatable yoke or support in which the second brake member is swiveled; a locking device adapted to engage said second brake member and positively hold it against forward rotation while permitting it to turn freely backward; and means for pressing the brake members together and for relieving them of pressure, alternately and as desired.

2. In combination with a wheel or part to be driven, a driving-wheel having limited rotary play independent of the driven wheel, and provided on its side face with inclines; a laterally-movable brake member; rollers interposed between said inclines and the laterally-movable brake member; a non-rotatable support for said member; a dog or pawl adapted to hold said member against forward rotation; and a second brake member rigidly secured to the wheel or part to be driven.

3. In combination with a wheel, and driving mechanism substantially such as described and shown, adapted to apply lateral pressure when moved in a backward direction; a brake, comprising a non-rotatable yoke or support, a friction member, swiveled therein; a coacting friction member carried by the driven wheel; and a pawl or detent adapted to engage and positively hold the swiveled friction member against forward rotation but to permit free backward rotation thereof.

4. In combination with yoke J and a rotatable clutch member swiveled therein and provided with a notch or notches; pawl or dog O adapted to engage in said notch or notches, and tapering in the direction of its movement, substantially as and for the purpose set forth.

5. In combination with a vehicle frame and wheel, a yoke J provided with a seat or recess of tapering form, a pawl or dog O having a body of corresponding form; a rotatable brake member mounted in the yoke and adapted to be engaged by said pawl or dog; a brake member secured to and rotatable with the wheel; and means for pushing said brake members into braking contact, substantially as described.

6. In combination with a wheel, and a frame or support, yoke J having a cavity or pawl-seat of decreasing width toward its lower end; a rotatable brake member seated therein and provided with notches in plane with said pawl-seat; a pawl or dog O, likewise of decreasing width toward its lower end and provided with a nose to engage in the notches of the rotatable member; whereby the dog is adapted to move radially inward and to engage said member when the latter turns in a direction to move the pawl downward, and to be lifted and moved radially outward by said member when turned in the reverse direction; and means substantially as described and shown for forcing the brake members into braking contact.

7. In combination with a brake member provided with a groove or depression, a cap or cover Q provided with a lip or flange $q'$ to enter the groove or depression, substantially as and for the purpose set forth.

In testimony whereof I have signed my name to this specification in the presence of two subscribing witnesses.

OMAR C. HOWES.

Witnesses:
ARCHIE A. SOMERS,
KELSIE HILL.